United States Patent [19]

Nalle, Jr.

[11] 4,399,184

[45] Aug. 16, 1983

[54] RIP RESISTANT NET

[76] Inventor: George S. Nalle, Jr., 401 Inwood Rd., Austin, Tex. 78746

[21] Appl. No.: 345,148

[22] Filed: Feb. 2, 1982

[51] Int. Cl.³ .......................... B32B 7/00; D03D 9/00
[52] U.S. Cl. .................................... 428/255; 428/371; 156/167; 264/81
[58] Field of Search ............... 428/255, 371, 373, 296; 156/167, 180, 181; 264/81

[56] References Cited

U.S. PATENT DOCUMENTS

| 4,020,208 | 4/1977 | Mercer et al. | 428/255 |
| 4,136,501 | 1/1979 | Connolly | 428/255 |
| 4,302,495 | 12/1981 | Marra | 428/255 |
| 4,348,445 | 9/1982 | Craig | 428/255 |

Primary Examiner—Marion McCamish
Assistant Examiner—Beverly K. Johnson
Attorney, Agent, or Firm—C. Lamont Whitham

[57] ABSTRACT

A rip resistant net is produced by the coextrusion of two or more polymers wherein some of each polymer is in every filament of the net.

6 Claims, No Drawings

RIP RESISTANT NET

BACKGROUND OF THE INVENTION

The present invention relates to net-like structures, and more particularly to a plastic net composed of composite filaments made up of two or more different plastic materials to provide the net with rip resistant properties.

It is known to extrude plastic nets by means of relatively rotating or reciprocating die members. These die members are provided with a plurality of orifices from which the filaments of the net are extruded. When the orifices of one die are immediately adjacent the orifices of the other die, the filaments from the two dies are fused together to form the interstices or crossings of the plastic net. If only two dies are used, a two-layer net will be produced. However, it is also known as shown in U.S. Pat. No. 3,227,124 to Anderson et al, for example, to provide a die head capable of producing a three-layer net. See also U.S. Pat. No. 3,123,512. The plastic nets produced in this manner have many diverse applications from produce bags and other packaging applications to netting for protecting agricultural crops from birds.

In my copending application Ser. No. 270,659, filed June 5, 1981 now U.S. Pat. No. ,4,353,956, I disclose a helical net-like structure comprising at least two crossing layers, the first layer being a plurality of first helical filaments, the axes of which are parallel and the second layer being a plurality of second helical filaments, the axes of which are parallel but intersect the axes of the first helical filaments. The first and second helical filaments are fused together at each point of intersection. To make this net-like structure, conventional net making equipment is used with the modification that each orifice of both relatively rotating or reciprocating dies is fed with two different plastic materials characterized by having different properties of contraction and orientation. One material may be a synthetic elastomeric rubber-like material such as butyl rubber, and the other a plastic material, such as polypropylene or polyethylene. The net is extruded from the die head in the usual manner, and then the filaments are oriented by stretching and releasing to cause the filaments to contract into helices.

DETAILED DESCRIPTION OF THE INVENTION

The present invention is the result of work I have done in developing my earlier invention of the helical net-like structure disclosed in the above-referenced copending application. Like the helical net-like structure, the rip resistant net according to this invention is made using conventional net making equipment again with the modification that each orifice of the relatively rotating or reciprocating dies is fed with two or more plastic materials, the combination of plastic materials being chosen to provide the desired rip resistant properties. This can be accomplished, for example, by making the filaments partially polypropylene and partially synthetic rubber. When a net composed of only polypropylene, for example, is ripped or torn, a zipper effect is set up because there is no load sharing between filaments. In other words, one filament receives the complete force until it breaks, then the next and the next. By adding an elastomer to the composition of the filaments, the elastomeric component stretches and tends to transfer some of the load to the next filament and so on thus increasing the rip resistance.

A net made entirely of elastomeric material would, of course, exhibit rip resistant properties. However, the tensil strength of elastomers is generally less than non-elastic polymers and the price is higher. In many applications, such as packaging, the large stretch factor of a net composed of only an elastomeric material is undesirable.

By coextruding two or more polymers or the same polymer with different characteristics wherein some of each polymer or polymer type is in every filament of the net, a net composed of composite filaments providing the desired rip resistant properties can be produced. At least one of the polymers might be a non-elastic plastic such as polypropylene or polyethylene which exhibits a relatively high tensil strength. At least another one of the polymers might be an elastomeric material such as a synthetic rubber having a relatively lower tensil strength than the non-elastic plastic. The rip resistant net according to the invention can be made as a three-layer net as well as a two-layer net with the filaments of each layer being a composite of two or more polymers or the same polymer family with different properties. The resultant net exhibits the shape retaining and rip resistant properties which make it particularly useful where rip resistance is important in such applications as packaging, tree guard, fish culture, window screening, bird screening, shelf liner, etc.

I claim:

1. A net-like structure comprising at least two crossing layers, the first of said layers being a first plurality of parallel filaments and the second of said layers being a second plurality of parallel filaments, said first and second pluralities of filaments intersecting one another and being fused together at each point of intersection, each of the filaments in each of said first and second pluralities of filaments being produced by the co-extrusion of two or more polymers wherein a continuous strip of each polymer is in every filament of the net-like structure.

2. A net-like structure as recited in claim 1 wherein at least one of said polymers is a non-elastic plastic having a relatively high tensil strength and at least another one of said polymers is an elastomeric material having a relatively lower tensil strength than said non-elastic plastic, the composite filaments of said non-elastic and said elastomeric material providing said net-like structure with rip resistant properties.

3. A net-like structure as recited in claim 2 wherein said non-elastic plastic is polypropylene.

4. A net-like structure as recited in claim 2 wherein said non-elastic plastic is polyethylene.

5. A net-like structure as recited in claim 3 or 4 wherein said elastomeric material is a synthetic rubber, ionometric resin, vinyl, or thermoplastic polyester.

6. A net-like structure comprising at least two crossing layers, the first of said layers being a first plurality of parallel filaments and the second of said layers being a second plurality of parallel filaments, said first and second pluralities of filaments intersecting one another and being fused together at each point of intersection, each of the filaments in each of said first and second pluralities of filaments being produced by the co-extrusion of two or more polymers of the same polymer family but with different physical characteristics such as melt index, density or molecular weight, at least two variations of the polymer running the continuous length of every filament of the net structure.

* * * * *